United States Patent [19]

Wiesler et al.

[11] 3,743,904
[45] July 3, 1973

[54] PRECISION POSITIONING MECHANISM, PARTICULARLY FOR POSITIONING TEST PROBES AND THE LIKE WITH RESPECT TO MICRO-ELECTRONIC UNITS

[75] Inventors: Mordechai Wiesler, Lexington; David T. Hunt, Tewksbury, both of Mass.

[73] Assignee: Teledyne, Inc., Hawthorne, Calif.

[22] Filed: May 1, 1972

[21] Appl. No.: 249,246

[52] U.S. Cl. .................... 318/162, 269/60, 219/69
[51] Int. Cl. .................... B23q 3/18, G05b 11/18
[58] Field of Search ............ 318/162, 600, 601, 318/602; 269/60; 219/69 V

[56] References Cited
UNITED STATES PATENTS
2,994,526  8/1961  Clawson .................... 269/60 X R
3,114,029  12/1963  Pascoe et al. .................. 219/69 V
3,613,501  10/1971  Sanders ...................... 318/162 X
3,638,933  2/1972  Burnette et al. ................. 269/60

Primary Examiner—B. Dobeck
Attorney—Gerald Altman et al.

[57] ABSTRACT

An X,Y movement for positioning test probes or the like with respect to micro-electronic units, comprises a support plate having at its under face (1), a pair of perpendicularly related guideways disposed along X and Y axes and (2), a pair of elongated slides, each being received by and slidable in one of the guideways but each being carried for movement only in a direction perpendicular to the guideway in which it slides. The arrangement is such that movement of the slide in the X guideway causes movement of the plate under the constraint of the slide in the Y guideway and movement of the slide in the Y guideway causes movement of the plate under the constraint of the slide in the X guideway.

15 Claims, 5 Drawing Figures

Patented July 3, 1973

PRECISION POSITIONING MECHANISM, PARTICULARLY FOR POSITIONING TEST PROBES AND THE LIKE WITH RESPECT TO MICRO-ELECTRONIC UNITS

BACKGROUND AND SUMMARY

The present invention relates to a device for the testing of micro-electronic units and, more particularly, to the testing of micro-electronic units typified by an array of solid state transistors, diodes or integrated circuits, which have been fabricated on a wafer and which are to be tested and classified prior to their being isolated and sorted. In such a device, the wafer typically is positioned on a support that is movable with respect to one or more stationary electrical probes, markers and/or other sensors. The operational sequence involves first moving the support along the X and Y axes in order to register a selected micro-electronic unit with respect to the sensors and then moving the support along the Z axis in order to cause a selected micro-electronic unit to be contacted by the sensors. Successive selection of the micro-electronic units of the array is continued until each of the micro-electronic units on the wafer has been tested and classified. In prior X,Y positioning mechanisms, one of the X and Y movements is disposed on the other and at least one of the X and Y drive motors moves, in consequence of which there is a tendency for rock and yaw. Also the undue complexity of such prior X,Y mechanisms causes undue expense.

The primary object of the present invention is to provide, on a base, an X,Y positioning mechanism in which a work support rides in a single plane and in which X and Y drive mechanisms are stationary, whereby rock and yaw of the support are minimized. The X,Y positioning mechanism of the present invention comprises a horizontally disposed support plate having at its under face a first guideway disposed along a Y axis and a second guideway disposed along an X axis, a first elongated slide on which the Y axis guideway floats, a second elongated slide on which the X axis guideway floats, a first screw for adjusting the position of the Y axis slide only along the X axis, a second screw for adjusting the position of the X axis slide only along the Y axis, and feet at opposed extremities of the work support riding on the base, so that precise movement of the work support along two perpendicular coordinates can be effected, notwithstanding the unusual simplicity of the components and compactness of their arrangement.

Other objects of the present invention will in part be obvious and will in part appear hereinafter.

The invention accordingly comprises the illustrated device, together with its components and their interrelationships, which are exemplified in the accompanying disclosure, the scope of which will be indicated in the appended claims.

BRIEF DESCRIPTION OF THE DRAWINGS

For a fuller understanding of the nature and objects of the present invention, reference is to be had to the following detailed description, taken in connection with the accompanying drawings, wherein.

DETAILED DESCRIPTION

Figure 1:
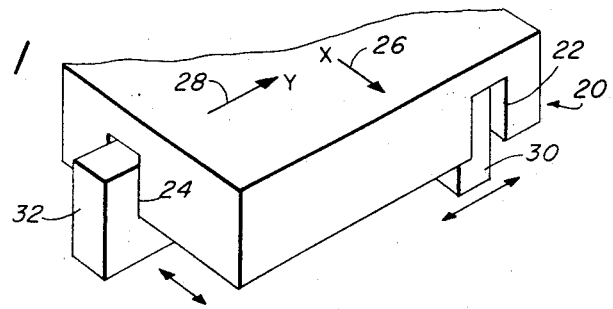
FIG. 1 is an exaggerated perspective view, partly broken away for clarity, illustrating components of the X,Y mechanism of the present invention.
Figure 3:
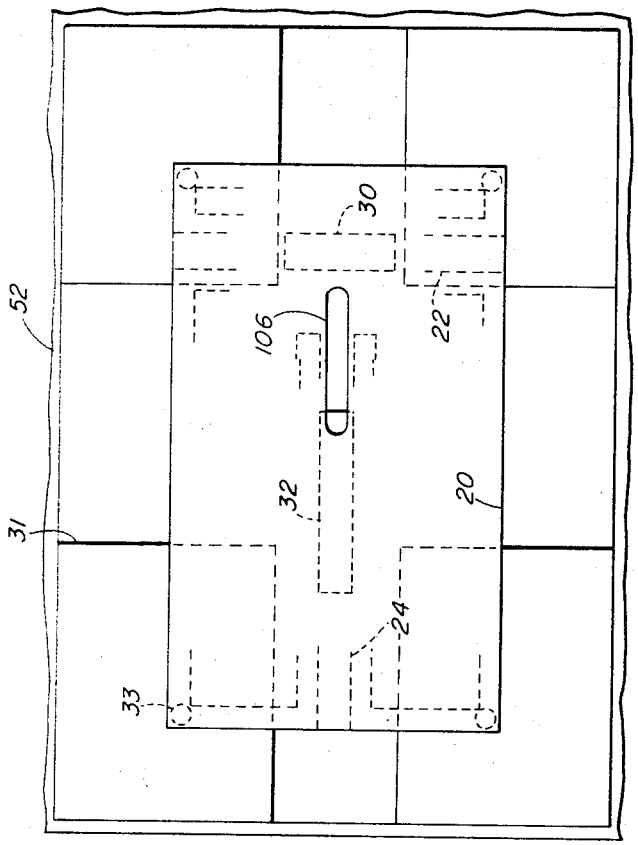
FIG. 3 is a top plan view, partly broken away, of the components of the device of FIG. 2 and associated components.

As shown in FIGS. 1 and 3, the illustrated X,Y movement involves a support plate 20 having a pair of underlying grooves 22, 24, groove 22 being disposed along an X axis 26 and groove 24 being disposed along a Y axis 28. Projecting into groove 22 is a tongue 30 and projecting into groove 24 is a tongue 32. Tongue 30 is elongated in the direction of groove 22 and, like groove 22 is rectangular in cross section. Tongue 32 is elongated in the direction of groove 24 and, like groove 24 is rectangular in cross section. At each corner of support plate 20 is fixed a support foot 33. At each corner of a base frame 34 is fixed a horizontal base plate 31 on which a corresponding support foot 33 slides. It will be apparent that when tongue 30 is adjusted along the Y axis by a suitable mechanism, plate 20 is constrained for movement along the Y axis by tongue 32 and that when tongue 32 is driven along the X axis by a suitable mechanism, plate 20 is constrained for movement along the X axis by tongue 30. Tongues 32, 30 are arranged so that they are limited in paths that are entirely free of one another. During such movement the horizontal condition of support plate 20 is maintained by feet 33 which ride at the four corners of plate 20 on the four coplanar base plates 31.

Figure 2:
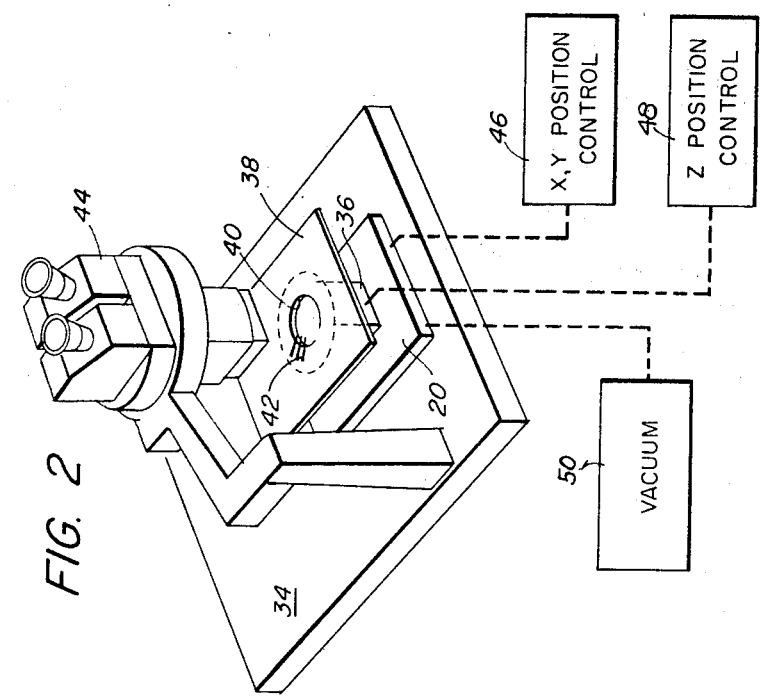
FIG. 2 is a schematic view, partly in mechanical perspective and partly in block diagram, illustrating a device within which the mechanism of FIG. 1 is incorporated.

As shown in FIG. 2, plate 20 is supported for movement on a base 34, details of which are discussed below in connection with FIGS. 3, 4 and 5. Supported on plate 20 is a Z axis movement 36, capable of vertical reciprocation between high and low limits. On Z axis movement 36 is a vacuum chuck capable of retaining a wafer having thereon a multiplicity of microelectronic units. Fixedly mounted above and connected to Z axis stage 36 is a centrally opened probe support plate 38, having a central opening 40 which generally is positioned above and registered with vacuum chuck 36 and which carries a plurality of probes 42 that project from positions surrounding the opening to positions overlying the opening. It will be apparent that when plate 20 is positioned as desired along the X and Y axes and vacuum chuck 36 is moved along the Z axis upwardly, then probes 42 are capable of contracting the microelectronic units on the wafer retained by the chuck.

Mounted above opening 40 is a stereo microscope 44 by which the wafer may be observed during the testing procedure. The position of plate 20 along X and Y axes is controlled by an electro-mechanical control 46 to be described in detail below, the Z axis operation of vacuum chuck 36 is controlled by an electro-mechanical control 48 and vacuum chuck 36 is provided with a vacuum by a suitable pump 50. Details of the electro-mechanical control 46 are shown in FIGS. 3, 4, and 5.

Figure 4:
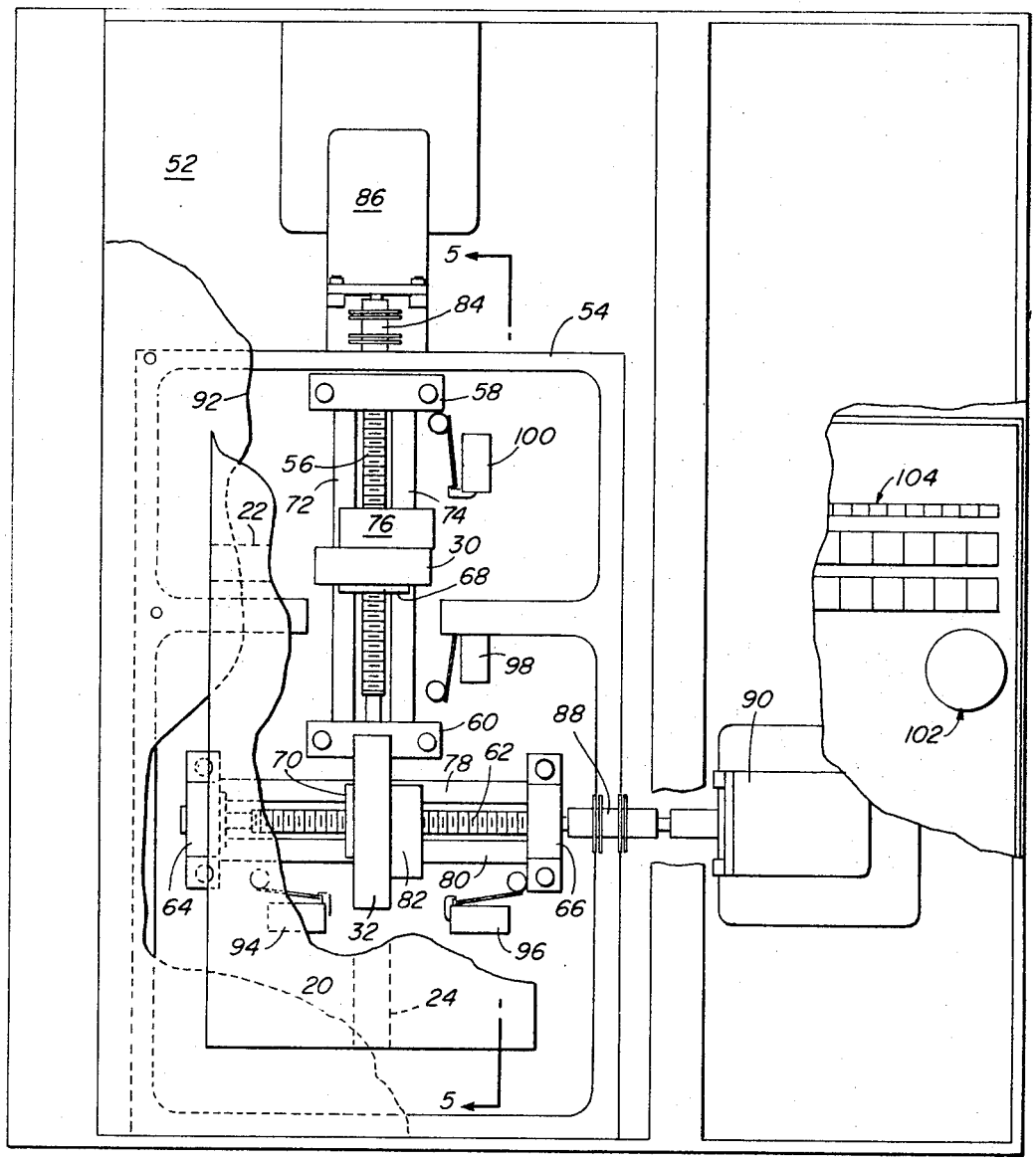
FIG. 4 is a view, corresponding to that of FIG. 3, illustrating additional details.
Figure 5:
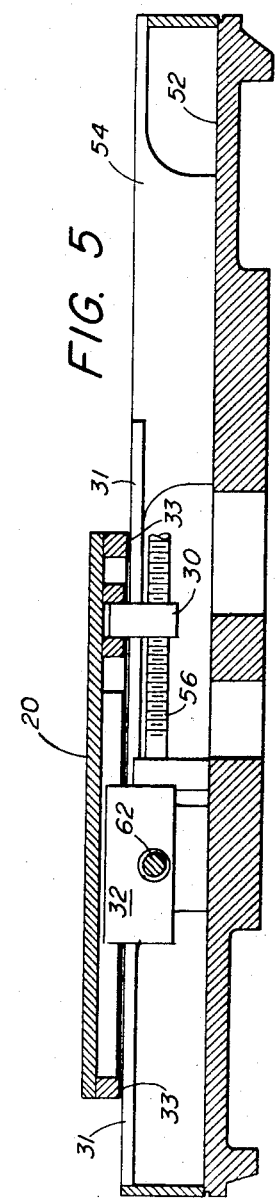
FIG. 5 is a cross-sectional view of FIG. 4, taken substantially along the line 5—5.

As shown in FIGS. 3, 4, and 5, base 34 is in the form of a casting having cross webbing 52 and vertical webbing 54, on which and by which the operating components of electro-mechanical control 46 are mounted. Extending along the Y axis is a helical screw 56, the unthreaded ends of which are journalled in blocks 58, 60, which are fixed to base 52, 54. Screw 56 extends through and meshes with an interiorly threaded bore of a rider nut 68. Extending along the X axis is a helical screw 62, the unthreaded ends of which are journaled and blocks 64, 66, which are fixed to base 52, 54. Screw 62 extends through and meshes with an interiorly threaded bore of a rider nut 70. Rider nut 68 mounts tongue 30 and rider nut 70 mounts tongue 32. Extending between blocks 58 and 60 are a pair of rails 72, 74, on which slides a block 76 that is affixed to rider nut 68 and that precludes rotation of tongue 30. Extending between blocks 64 and 66 are a pair of rails 78, 80, on which slides a block 82 that is affixed to rider nut 70 and that precludes rotation of tongue 32. It will be observed in FIG. 4 that the upper extremity of screw 56 is connected by a coupling 84 to a stepping motor 86 and that right extremity of screw 62 is connected by a coupling 88 to a stepping motor 90. Stepping motors 86, 90 each selectively operates clockwise and counterclockwise to advance or retract rider nuts 68, 70. Mounted on base 52, 54 is a dust shield 92 which extends under support plate 20 and which is centrally apertured to permit movement of tongues 30, 32 between their maximum limits. In alternative embodiments stepping motors 86 and 90 are replaced by hydraulic or electrical servo motors.

OPERATION AND CONCLUSION

In operation, a wafer, upon which an array of microelectronic units has been fabricated, is positioned on vacuum chuck 36. While under observation through microscope 44, plate 20 is positioned along X and Y axes until test probes 42 are in registration with appropriate portions of a selected one of the microelectronic units. Next vacuum chuck 36 is actuated in order to cause movement of the wafer and the selected micro-electronic unit along the Z axis into contact with probes 42. Next this process is continued sequentially until all of the micro-electronic units on the wafer are so tested. As shown in FIG. 4 a pair of limit switches 94, 96 indicate the end of permitted travel of tongue 32 and a pair of limit switches 98, 100 indicate the end of permitted travel of tongue 30. By virtue of the precisely measured rotation of motors 86 and 90, positioning of plate 20, and consequently, positioning of any particular selected micro-electronic unit is achieved. A control panel having a control knob 102 and indicators 104 for a motor control circuit also are provided.

The present invention thus provides a precision X,Y movement, that is characterized by unusual compactness. Since certain changes may be made in the foregoing disclosure without departing from the scope of the present invention, it is intended that all matter described in the foregoing specification or shown in the accompanying drawings be interpreted in an illustrative and not in a limiting sense.

What is claimed is:

1. An X,Y movement comprising a base, a support means having an upper side and a lower side, said upper side being adapted to carry an object to be positioned, said lower side presenting an X guideway disposed along and X axis and a Y guideway disposed along a Y axis, an elongated X slide received by said X guideway, an elongated Y slide received by said Y guideway, Y constraining means on said base for permitting movement of said X slide only along said Y axis, X constraining means on said base for permitting movement of said Y slide only along said X axis, a Y control for moving said X slide along said Y axis, and an X control for moving said Y slide along said X axis.

2. The X, Y movement of claim 1 wherein said Y constraining means includes a first helical screw rotatable on said base and a threaded rider on said first helical screw and attached to said X slides, and said X constraining means includes a second helical screw rotatable on said base and a threaded rider on said second helical screw and attached to said Y slide.

3. The X,Y movement of claim 2 wherein said Y control is a servo motor that drives said first screw and said X control is a servo motor that drives said second screw.

4. The X,Y movement of claim 1 wherein said support means is a plate, said X guideway is a slot, said Y guideway is a slot, said X slide is a tongue, and said Y slide is a tongue.

5. An X,Y movement comprising a base, a support plate having an upper face and a lower face, said upper face being adapted to carry an object for positioning in a horizontal plane, said lower face presenting a first guideway disposed along an X axis and a second guideway disposed along a Y axis, a first elongated slide received by said first guideway of said plate a second elongated slide received by said second guideway of said plate, a first helical screw journaled at opposite ends on said base and extending along said Y axis, a second helical screw journaled at opposite ends on said base and extending along said X axis, a first rider having an internally threaded bore receiving said first helical screw and meshing therewith, a first guideway on said base, a first slide affixed to said first rider and engaged by said first guideway of said base in order to prevent rotation of said first rider, a second rider having an internally threaded bore receiving said second helical screw and meshing therewith, a second guideway on said base, a second slide affixed to said second rider and engaged by said second guideway of said base in order to prevent rotation of said second rider, a first motor on said base coupled to said first helical screw, a second motor on said base coupled to said second helical screw, and control means for actuating said first motor in a selected one of its two directions of rotation and for actuating said second motor in a selected one of its two directions of rotation.

6. An X, Y movement comprising a base, a support means having an upper side and a lower side, said upper side being adapted to carry an object to be positioned, said lower side presenting an X guideway disposed along an X axis and a Y guideway disposed along a Y axis, an elongated X slide received by said X guideway, an elongated Y slide received by said Y guideway, Y constraining means on said base for permitting movement of said X slide only along said Y axis, X constraining means on said base for permitting movement of said Y slide only along said X axis, a Y actuator for moving said X slide along said Y axis, and an X actuator for moving said Y slide along said X axis, said Y constraining means including a first helical screw rotatable on said base and a threaded rider on said first helical screw and attached to said X slides said X constraining means including a second helical screw rotatable on said base and a threaded rider on said second helical screw and attached to said Y slide.

7. The X,Y movement of claim 6 wherein said Y actuator is a motor that drives said first screw and said X actuator is a motor that drives said second screw.

8. The X,Y movement of claim 6 wherein said support means is a plate, said X guideway is a slot, said Y guideway is a slot, said X slide is a tongue, and said Y slide is a tongue.

9. The X,Y movement of claim 6 wherein a first pair of switches indicate the limits of travel of said support means along said X axis and a second pair of switches indicate the limits of travel of said support means along said Y axis.

10. An apparatus for micro-electronic units in an array, said apparatus comprising a base, a vacuum chuck for retaining said array, an X,Y movement on said base, a Z movement on said X,Y movement, said vacuum chuck being carried by said Z movement, a probe holder mounted on said base, a plurality of stationary probes mounted on said base, said X,Y movement carrying said chuck for movement along X and Y axes with respect to said probes, said Z movement carrying said chuck along a Z axis with respect to said probes, said X,Y movement comprising a base, a support means having an upper side and a and a lower side, said upper side being adapted to carry an object to be positioned, said lower side presenting an X guideway disposed along an X axis and a Y guideway disposed along a Y axis, an elongated X slide received by said X guideway, an elongated Y slide received by said Y guideway, Y constraining means on said base for permitting movement of said X slide only along said Y axis, X constraining means on said base for permitting movement of said Y slide only along said X axis, a Y stepping actuator for moving said X slide along said Y axis, and an X stepping actuator for moving said Y slide along said X axis.

11. The apparatus of claim 10 wherein said Y constraining means including a first helical screw rotatable on said base and a threaded rider on said first helical screw and attached to said X slides, said X constraining means including a second helical screw rotatable on said base and a threaded rider on said second helical screw and attached to said Y slide.

12. The apparatus of claim 10 wherein said Y actuator is a motor that drives said first screw and said X actuator is a motor that drives said second screw.

13. The apparatus of claim 10 wherein said support means is a plate, said X guideway is a slot, said Y guideway is a slot, said X slide is a tongue, and said Y slide is a tongue.

14. The apparatus of claim 10 wherein a first pair of switches indicate the limits of travel of said support means along said X axis and a second pair of switches indicate the limits of travel of said support means along said Y axis.

15. An apparatus for testing solid state microelectronic units in an array, said apparatus comprising a base, a vacuum chuck for retaining said array, an X,Y movement on said base, a Z movement on said X,Y movement, said vacuum chuck being carried by said Z movement, said Z movement being carried by said X,Y movement, a probe holder mounted on said base, a plurality of stationary probes mounted on said base, said X,Y movement carrying said chuck for movement along X and Y axes with respect to said probes, said Z movement carrying said chuck along a Z axis with respect to said probes, said X,Y movement comprising a base, a horizontal plate having an upper face and a lower face, said upper face being adapted to carry an object for positioning in a horizontal plane, said lower face presenting a first groove disposed along an X axis and a second groove disposed along a Y axis, a first elongated tongue received by said first groove, a second elongated tongue received by said second groove, a first helical screw journaled at opposite ends on said base and extending along said Y axis, a second helical screw journaled at opposite ends on said base and extending along said X axis, a first rider having an internally threaded bore receiving said first helical screw and meshing therewith, a first guideway on said base, a first slide affixed to said first rider and engaged by said first guideway in order to prevent rotation of said first rider, a second rider having an internally threaded bore receiving said second helical screw and meshing therewith, a second guideway on said base, a second slide affixed to said second rider and engaged by said second guideway in order to prevent rotation of said second rider, a first stepping motor on said base coupled to said first helical screw, a second stepping motor on said base coupled to said second helical screw, and control means for actuating said first stepping motor in a selected one of its two directions of rotation and for actuating said second stepping motor in a selected one of its two directions of rotation.

* * * * *